July 19, 1966
J. R. RICHARDS
3,262,091
SOUND RANGE RECORDER
Filed July 3, 1951
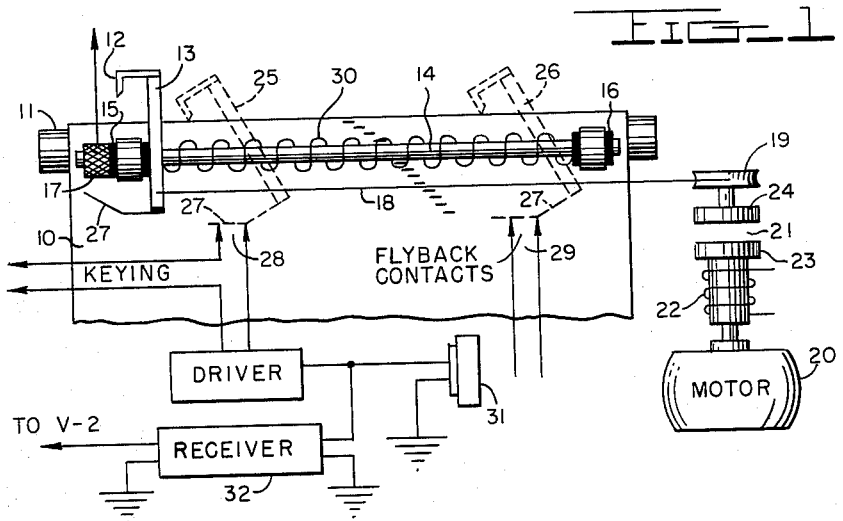
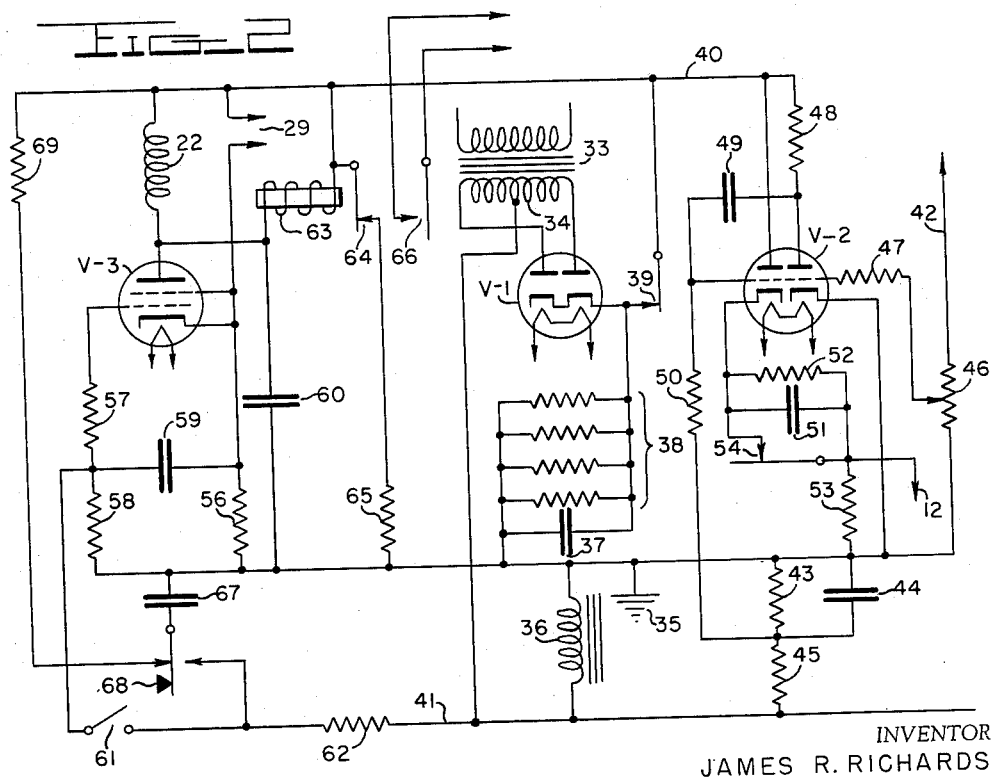
INVENTOR
JAMES R. RICHARDS
BY
ATTORNEYS

United States Patent Office

3,262,091
Patented July 19, 1966

3,262,091
SOUND RANGE RECORDER
James R. Richards, Cheverly, Md., assignor to the United States of America as represented by the Secretary of the Navy
Filed July 3, 1951, Ser. No. 235,081
7 Claims. (Cl. 340—3)

The invention described herein may be manufactured and used by or for the Government of the United States of America for governmental purposes without the payment of any royalties thereon or therefor.

The present invention relates in general to underwater sound systems and in particular to a keying control for underwater, compressional wave, range and bearing determining systems.

The principle of echo ranging and range recording is generally known and is usually accomplished by synchronously correlating a time base with the transmission of short pulses of waves and reception of echoes thereof from an object whose range is to be determined or recorded. A suitable time base is usually provided by the motion of a stylus across a strip of record paper, the latter fed at right angles to the motion of the stylus, the stylus moving at a constant predetermined speed. An automatic keying switch operated by movement of the stylus shortly after starting its timed movement across the record sheet effects the transmission of a ping or pulse of compressional wave energy by the underwater sound system. The instant of transmission of the wave energy is marked on the paper, for example, by electrochemical effect produced by passage of a current through the stylus and paper in known manner. The arrival of a pulse echo is likewise marked, and the interval between the two marks measure the distance between the transmitting source and the reflecting object according to a scale previously calibrated along the time base in terms of distance based upon the ratio of stylus speed to speed of propagation of the compressional wave energy. After a predetermined time limit near the limit of the time base a switch is operated upon movement of the stylus to the position representing such limit which operation brings about a rapid return of the stylus to its starting position, which return movement is generally referred to as the fly-back. Operation of the fly-back switch also sets into operation timing means operable after a given time to effect initiation of a repeat movement of the stylus across the record paper. There is thus established an automatic repetitive cycle. Timing of the complete cycle is accomplished by a time base generator in the form of a constant speed motor located in the recorder.

It is in such a known system that the present invention is used. In the use of such systems in some instances as in antisubmarine operations, the regular series of pulse transmission even for brief periods of time is of serious disadvantage in that it becomes relatively simple for the submarine which is being attacked to judge the rate of closure and sometimes the actual position of the attacking ship.

It is an object of the present invention to improve systems of the above type whereby, at will, the regular repetitive sending of impulses may be eliminated and a manual control substituted for sending forth a single pulse or ping timed with a single stylus cycle.

Another object is the provision of a control circuit for readily effecting the change over from automatic repetitive pinging to a single ping manual control by simply throwing a switch from an automatic to a manual control position.

Various other objects and advantages of the invention will become apparent from a perusal of the following specification and the drawings accompanying the same.

In the drawings:
FIG. 1 is an automatic range recording apparatus of the type to which the present invention is applicable.
FIG. 2 is a circuit diagram.

Referring to the drawings in detail, and first to FIG. 1 the recorder is of generally known type having a record sheet 10 drawn over a platen roller 11 continuously or intermediately in known or other suitable manner with a dot recording stylus 12 arranged to be drawn across the record from left to right at constant speed to establish a time base. The stylus is carried by a stylus carriage 13 slidable along a metal guide rod 14 insulated from the machine by means of suitable insulating bushings 15 and 16 in its end supports. The stylus and stylus carriage being formed of metal, circuit connection may be made with the point of the stylus through the carriage, guide rod and binding post 17 formed at the left hand end extension of the guide rod.

Means are provided for moving the carriage along the rod from left to right comprising a tow cord 18, attached to the carriage and pulled by a winding drum 19 adapted to be driven by a constant speed motor 20 through a magnetic clutch 21 energized by a clutch coil 22 to effect engagement of the driving element 23 with the driven element 24 connected with the winding drum.

The carriage 13 may be prevented from rotation about the axis of the guide rod by any known or other suitable expedient not shown as by the use of two parallel rods, a square rod, or by splining the carrier on the rod. In any case the carriage is given sufficient angular play in the plane of the rod to permit it to tilt under the pulling force of the tow cord, as indicated in dotted line at the position 25 and 26 and for reasons to be presently explained. Mounted on the lower end of the carriage and insulated therefrom is a bridging contact element 27 arranged to bridge first the keying contacts 28 and then the flyback contacts 29 in the travel of the carriage from left to right. In the normal starting position of the carriage as shown in the drawing, the bridging contact 27 assumes a position above the plane of the sets of contacts 28 and 29. Upon operation of the drum to move the carriage from left to right, tension on the tow cord tilts the carriage as shown at 25 and 26 to bring the bridging contact element down to the plane of the contacts 28 and 29. Upon release of the clutch and with negligible tension on the tow cord the carriage is returned to the starting position shown by force of the compression spring 30 compressed during right hand movement of the carriage. Release of tension on the tow cord during return movement of the carriage permits the latter to assume the vertical position raising the bridging contact 27 thus preventing circuit closure through the keying contacts 28 upon fly-back. The contacts 28 control jointly with a relay contact in the control circuit to be later described, the keying of a driver for an underwater compressional wave transducer 31. A suitable electrical receiver 32 receives electrical signals from the transducer in known manner for transmission to the control circuit.

The control circuit for the above system which circuit embodies my invention is shown diagrammatically in FIG. 2. Here is shown a circuit for permitting automatic repetitive keying or pinging, together with means for discontinuing the automatic control and establishing a manual control for producing a single ping at will while guarding against accidental production of an unwanted ping by the automatic control elements.

Power supply is provided by transformer 33 whose high voltage secondary winding 34 supplies, for example, 460 volts A.C. directly to the plate of the full wave rectifier tube V–1 which may be a 6X56T gas tube. Current supply for the heaters of the twin diode tube V–1 may be of any well known or other suitable form of low voltage alternating current supply not shown. Such low voltage heater current may be derived from a third winding on the power transformer 33, not shown and which may be provided in known manner. The mid-point of the secondary winding 34 is connected to ground 35 through a filter choke 36, the remainder of the filter combination consisting of the 30 microfarad condenser 37. A fixed 20,000 ohm bleeder resistance 38, comprised of the four 80,000 ohm resistances connected in parallel, limits the peak D.C. voltage of the system. At standby with the main switch contact 39 closed and 117 volts supplied to the primary of the transformer, the D.C. voltage on the high voltage supply line 40 will be approximately 200 volts. At full power output the voltage drops to approximately 165. The filter choke 36 being interposed between the mid-point of the rectifier winding 34 and ground gives such mid-point, and consequently the conductor 41 with which it is directly connected, a negative D.C. potential with respect to ground. This affords a negative potential supply for use in a manner presently described.

The system includes a signal amplifier receiver comprised of the twin triode tube V–2 in the present instance a 65N7GT with suitable circuit components for reception and amplification of signals incoming over the input conductor 42 of the receiver 32 of FIG. 1 to transmit a recording pulse of D.C. current to the stylus point 12 of the recorder shown diagrammatically in FIG. 1. A one megohm resistor 43 shunted by a 24 microfarad condenser 44 is placed in series with a .25 megohm resistor 45 providing a potential minus 12 volts to ground across the resistor. This value obtains only when the recorder is running normally, the long, time constant of the filter combination eliminating transients in the bias during flyback of the stylus. A 50,000 ohm potentiometer 46 connected between the signal conductor 42 and ground has its adjustable tap or brush connected through an 80,000 ohm resistor 47 to the grid of the right hand section of the twin triode V–2. The cathode of this triode section is at ground potential, while the anode is connected to the high voltage supply line 40 through an 80,000 ohm resistor 48. This circuit provides a voltage amplifier which is sensitive only to negative swings of the alternating current signal applied to the control grid.

The anode of this right hand section of the twin triode is coupled to the control grid of the left hand section by a .001 microfarad condenser 49, this grid being biased through a one megohm resistor 50 at minus 12 volts. This second triode section is operated as a cathode follower, the anode being connected directly to the positive high voltage supply conductor 40 and the cathode through the stylus circuit to ground. In series with the cathode and stylus 12 is a 24 microfarad electrolytic condenser 51 shunted by a 30,000 ohm carbon resistor 52, the stylus being shunted to ground by a 30,000 ohm resistor 53. Thus amplified signals applied to the left hand triode grid result in elevation of the cathode with respect to ground with consequent current flow through the resistor-capacitor combination and through the stylus and the record sheet to ground with resultant visible chemical reaction to make a mark on the record, indicating range. The charge developed on the condenser prevents further current flow unless the cathode potential exceeds the potential of the charge remaining on the condenser. This results in that reverberation and background noise build up a potential across the capacitor immediately after transmission of a pulse from the ships transducer. Any further noise cannot record since current cannot flow in the circuit combination unless the receiver signal produces a cathode potential greater than that on the capacitor. This in turn is determined by the magnitude of the earlier received signal impulses and the time constant of the resistor-capacitor combination. Because under some conditions it is undesirable to employ the noise suppression circuit just described, a normally open shunting switch 54 is provided for establishing a short circuit around the resistance capacitor combination. A 30,000 ohm resistor 53 connects the stylus to ground to provide a sharp cutoff for the output triode.

The control circuit for the mechanical operation of the recorder and consequently the transmission of the searching pulses of compressional waves, makes use of a type 2050 gas tetrode V–3 controlling energization of the clutch-magnet winding 22. The winding which in the present instance has a resistance of approximately 400 ohms, is connected between the positive high voltage supply line 40 and the anode of the tube V–3. The circuit to ground from the cathode of this tube is completed through a 2,000 ohm wire wound resistor 56. The grid or control electrode of the gas tube is connected to ground through a 5 megohm resistor 57 and a one megohm leak resistor 58, a 0.1 microfarad biasing condenser 59 coupling the junction of these two resistors to the cathode. The action of the current flowing in the cathode circuit through resistance 56 is to impress a potential of approximately 100 volts across the condenser, the cathode side of the condenser being positive to the grid side. Closure of the flyback contacts 29 directly connects the high voltage D.C. line to the cathode effecting a short circuit across the magnetic clutch coil 22 and gas tube V–3 which brings the current through the combination to zero and deionizes or extinguishes the tube. The clutch coil 22, constant speed motor 20 and flyback contacts 29, thus constitute time controlled means energized in the anode circuit of the gas tube for extinguishing the tube after a given time. Deenergization of the coil 22 of course permits the stylus to fly back to starting position. A 0.6 microfarad condenser 60 connected from the anode of the gas tube to ground assists in the de-energization of the tube, by offering an outlet for the inductive energy of the clutch winding 22. Upon opening of the flyback contacts the cathode at once drops to ground potential. The condenser 59, still 100 volts negative with respect to the cathode or ground, holds the grid at this same potential with respect to the cathode so that the tube, for the time being, will not ionize. The condenser, however, at once commences discharging through the bleeder circuit comprised of the one megohm grid resistor 58 and 2,000 ohm cathode resistor 56. When the potential of the condenser reduces to about 2 volts negative on the grid side the tube breaks down and the cycle of operations is repeated. The time constant of this discharge circuit is such that sufficient time is allowed for the stylus to return to its starting point from its maximum travel with a short dwell for safety.

Under circumstances where it becomes most desirable to eliminate the above described automatic repetitive operation and substitute operation through the use of a single ping produced at will, it is advantageous that the change over be readily and quickly accomplished as by the throwing of a toggle switch. To this end there is provided the alternate, single ping, manual control arrangement incorporated in the circuit diagram of FIG. 2. Here a change over switch 61 is arranged to establish connection of the negative potential supply conductor 41 through a limiting 1 megohm resistance 62 to the junction of condenser 59 with grid resistance 57 to establish a blocking negative bias on the control grid of the gas tube V–3. To enhance this bias, a 1,000 ohm quick acting relay 63 connected in parallel with the clutch coil 22, maintains through a back contact 64 a load across the power supply conductor 40 and ground through a 2500 ohm resistance 65 when the tube is not conducting. This puts a drop of 19 volts minus to ground across the filter choke 36. The gas tube is thus normally blocked. A normally open front contact 66 on the relay 63 controls jointly with the keying contacts 28 on the recorder, the keying of the driver of the transducer 31. A storage condenser 67 of 0.1 mf. has one terminal grounded and the other normally connected to the positive high voltage supply conductor 40 through the back contact of a biased double throw momentary switch 68, to maintain the condenser charged to the anode supply voltage. A normally open front contact on the momentary switch 68 operates upon closure to connect the charged condenser 67 to the junction of the limiting resistance 62 with the change over switch 61, and through the switch to the grid circuit of gas tube V–3 to momentarily apply the full positive anode voltage charge to the grid circuit.

Now, to transmit a single ping at will starting the echo recorder for a single cycle operation, the operator having closed the change over switch 61, actuates the momentary switch 68 to momentarily connect the positive side of the charged condenser 67 through switch 61 to the grid circuit of the gas tube V–3. This causes the tube to fire, energizing the clutch coil 22 and relay 63. Energization of the clutch coil 22 (FIG. 1) couples the constant speed motor 20 to the winding drum 19 to tilt the stylus carriage 25 as indicated in dotted lines and draw it from left to right at the predetermined constant speed. Tilting of the carriage brings the stylus 12 into contact with the record sheet, and brings the bridging contact 27 into the plane of the keying contacts 28. Then at an early part of the timed movement of the stylus carriage across the record sheet the bridging contact is brought into engagement with the keying contacts to close for a predetermined short time, the keying circuit of the driver, this circuit having been readied by closure of the normally open front contacts 66 on relay 63. The gas tube stays conducting until it is extinguished by closure of the flyback contacts 29 by the bridging contact 27 at the end of the stylus travel as indicated at the right hand end of FIG. 1. Closure of the flyback contacts 29 momentarily completes the short circuit across the clutch coil 22 and the gas tube, deenergizing the clutch coil and relay 63. Immediately upon deenergization of the clutch, the carriage flys back, immediately opening the flyback contacts to remove the above mentioned short circuit. However the gas tube is now restored to a nonconducting condition due to the voltage drop across impedance 36 caused by restoration of the load through resistance 65 and back contact 64. The storage condenser 67 having in the meantime taken on a charge, upon release of the momentarily actuated switch 68 to the normal position shown, readies the circuit for a repetition of the above described operation at will. A current limiting resistance 69 may be placed in series in the charging circuit of storage condenser 67 to protect the normally closed contact of switch 68 against undue burning or welding.

While but a single embodiment of the invention has been shown and described herein for the sake of disclosure, it is to be understood that the scope of the invention is not limited to such specific embodiment but contemplates all such modifications and variants thereof as fall fairly within the scope of the appended claims.

What is claimed is:

1. In an underwater electrosonic range recorder system of the type using a recorder having a mechanically driven time base element whose movement in the time measuring direction is maintained by sustained energization of an electrically actuated clutch element and whose flyback movement is effected by means of a compression spring upon release of the clutch, a control circuit for the recorder system comprising a normally open flyback switch closed upon travel of the time base element to a predetermined limit in the time measuring direction, an electron tube connected to complete an energizing circuit for the clutch actuating element when the tube becomes conducting, a relay connected in multiple with the clutch actuating element for simultaneous energization with the latter, a pair of normally closed and a pair of normally open contacts for the relay, said normally closed contacts maintaining a cut-off bias on said tube and said normally open contacts controlling a keying circuit for a sound projector driver to enable keying only during actuation of the clutch, means for changing the said bias to render the tube conducting, and a shunting circuit for said clutch actuating element, relay and tube closed through said flyback contacts whereby closure of said contacts will deenergize the clutch and relay to permit flyback movement of the time base element and restore the cut-off bias.

2. In an underwater electrosonic range recorder system of the type using a recorder having a mechanically driven time base element whose movement in the time measuring direction is maintained during energization of an electrically actuated clutch element and whose flyback movement is effected by means of a compression spring upon release of the clutch, a control circuit for the recorder system comprising a normally open flyback switch closed upon travel of the time base element to a predetermined limit in the time measuring direction, an electron discharge gas tube having an anode, cathode and grid, a source of anode current for the tube, said source and tube being connected to include the electrically actuated clutch element in the anode circuit of the tube for energization of the clutch element when the tube becomes conducting, a relay connected in parallel with the clutch actuating element for simultaneous energization with the latter, said relay having a pair of normally closed and a pair of normally open contacts, said normally closed contacts maintaining completion of a circuit providing a negative cut-off bias on the grid of the tube and said normally open contacts controlling a keying circuit for a sound projection driver to permit keying only during energization of said clutch actuating element, manually controlled means for changing said bias to render the tube conducting and a tube extinguishing circuit momentarily closed through said flyback contacts momentarily connecting the cathode to the said anode current source to thereby extinguish the tube whereby closure of said flyback contacts will extinguish the tube, deenergizing the relay to restore the negative cut-off bias.

3. In an underwater electrosonic range recorder system of the type using a progressively movable time measuring element, motor means, a clutch for connecting said movable element with the motor for driving said element, and an actuating electromagnet for the clutch, the combination with said electromagnet and said movable element, of a gas tetrode control tube for the said electromagnet having an anode, cathode and grid, an anode current supply having its positive terminal connected to said anode through said electromagnet, a relay connected in shunt with said electromagnet for simultaneous energization therewith and having a pair of normally closed and a pair of normally open contacts, said normally closed contacts maintaining completion of a circuit providing a negative cut-off bias on the said grid of the tube and said normally open contacts controlling a keying circuit for a sound projector for the electrosonic range recorder system, manually controlled means for raising the potential of the grid to fire the gas tube to maintain the electromagnet energized, a contact element actuated upon a predetermined extent of movement of the time measuring element to close a shunt circuit around the electromagnet, relay and tube, whereby the tube is clocked and the electromagnet and relay are deenergized restoring the negative bias on the grid of the tube.

4. In a control circuit for underwater sound range recording systems of the type having a time base recording device biased to zero reading and an electrically actuated control means operable during energization to maintain progressive operation of the time base device and upon deenergization to permit the time base device to return to zero, the combination with said electrically actuated control means and said time base device of a gas tube discharge device controlling the energization of the electrically actuated control means, said tube having a control grid, a high capacity biasing condenser connected to accumulate a charge while the gas tube is in a conducting condition for applying a negative blocking potential to the grid, a pair of flyback contacts momentarily closed upon a given progressive movement of the time base device and operable upon closure to short circuit the tube and render it non-conducting, a leak resistance bridging said condenser for discharging the latter after blocking of the tube to a value permitting refiring of the tube, means operable at will for maintaining negative bias on the grid independently of said leak resistance, and means operable at will for applying a positive pulse to the grid to fire the tube.

5. A control circuit as claimed in claim 4 in which the means operable at will for maintaining a negative bias on the grid comprises an impedance through which a flow of current is maintained, a relay energized in parallel with said electrically actuated control means and operable during deenergization to increase the flow of current through said impedance, and a manual switch for applying to the grid the negative value of the drop in voltage through said impedance.

6. In a control circuit for an underwater sound range recording system of the type having a time base recording device biased to zero reading and an electrically actuated control means operable during energization to maintain progressive operation of the time base device and upon deenergization to permit the time base device to return to zero reading, the combination with said electrically actuated control means and said time base device of a gas tube controlling the said electrically actuated time base control means, said tube having an anode, cathode and control grid, means for extinguishing the tube at a given point in the progressive operation of said time base device, a condenser-resistance time constant circuit charged during conductive operation of the tube for maintaining the tube blocked for a given time after extinguishment, manually controlled means for maintaining the tube blocked independently of said time constant circuit, and manually operated means for momentarily applying a positive voltage to the grid to fire the tube.

7. In an underwater sound range recording system of the type having a time base recording stylus biased to a zero reading position and an electrically actuated stylus moving means and actuating circuit therefor operable by a current therethrough to maintain progressive operation of the time base stylus and upon cessation of said current to permit the stylus to return to zero indication, a control circuit for said recorder system comprising: a gas tube discharge device having an anode, a cathode and a control electrode, a source of high potential current for the tube having its negative terminal connected through an impedance element to ground, the positive terminal of said source being connected through said actuating circuit to said anode, a cathode resistor connecting said cathode to ground, a bias capacitor and series bias resistor shunting said cathode resistor to ground, a grid leak resistor interconnecting the control anode and the bias junction of said bias resistor and capacitor, a pair of normally open contacts closed at a given position of said stylus spaced from said zero reading position and open upon movement of said stylus to said zero position, said contacts being connected, respectively, to said actuating circuit and said cathode, an electrically actuated relay connected in parallel with said electrically actuated control means and having a normally closed back contact, an auxiliary load resistor connected between the positive terminal of said source and ground through said back contact to stabilize the potential of said source, a manual switch and series limiting resistor interconnecting the negative terminal of said source and said bias junction, a storage capacitor grounded at one terminal, and a two position manually operated switch means for alternately connecting the remaining terminal of said storage capacitor between the positive terminal of said source and the said bias junction.

References Cited by the Examiner
UNITED STATES PATENTS

| 1,965,589 | 7/1934 | Foulke | 250—27 |
| 2,409,583 | 10/1946 | Perkins | 250—27 |
| 2,610,244 | 9/1952 | Wolf | 340—3 |
| 2,680,808 | 6/1954 | Nolde | 250—27 |

FOREIGN PATENTS

| 448,407 | 6/1936 | Great Britain. |

OTHER REFERENCES

Seely, Electron-Tube Circuits, page 288, copyright Jan. 13, 1950.

CHESTER L. JUSTUS, *Primary Examiner.*

NORMAN T. EVANS, JAMES L. BREWRINK, J. R. SPALLA, *Examiners.*

P. H. BLAUSTEIN, R. A. FARLEY, *Assistant Examiners.*